(12) United States Patent
Korver et al.

(10) Patent No.: US 6,373,403 B1
(45) Date of Patent: *Apr. 16, 2002

(54) APPARATUS AND METHOD FOR IMPROVING THE SAFETY OF RAILROAD SYSTEMS

(76) Inventors: Kelvin Korver, R.R. 1, Box 93A, Adams, NE (US) 68301; Wesley Hawkinson, 94 Shasta Cir. E., Chanhassen, MN (US) 55317; Donovan Boedigheimer, 1967 113th Ave., NW., Coon Rapids, MN (US) 55433

( * ) Notice: Subject to any disclaimer, the term of this patent is extended or adjusted under 35 U.S.C. 154(b) by 0 days.

This patent is subject to a terminal disclaimer.

(21) Appl. No.: 09/434,246

(22) Filed: Nov. 5, 1999

Related U.S. Application Data

(63) Continuation of application No. 08/811,128, filed on Mar. 3, 1997, now Pat. No. 5,986,547.

(51) Int. Cl.$^7$ ................................................ G08G 1/23
(52) U.S. Cl. .................. 340/988; 340/933; 340/825.49; 701/19; 701/205; 701/207; 246/120; 246/121
(58) Field of Search ................................ 340/988, 500, 340/933, 825.49, 539; 33/651, 1 Q; 702/183, 184, 185; 701/19, 205, 207; 246/120, 121, 1 R, 1 C, 166

(56) References Cited

U.S. PATENT DOCUMENTS

| 4,174,636 A | * 11/1979 | Pagano ......................... 73/636 |
| 4,306,694 A | * 12/1981 | Kuhn ......................... 246/125 |
| 4,599,620 A | 7/1986 | Evans ......................... 343/357 |
| 4,667,203 A | 5/1987 | Counselman, III .......... 342/357 |
| 4,674,327 A | 6/1987 | Swindall et al. ............... 73/146 |
| 4,796,191 A | 1/1989 | Honey et al. ................ 364/450 |
| 4,860,018 A | 8/1989 | Counselman, III .......... 342/357 |
| 4,878,170 A | 10/1989 | Zeevi ......................... 364/449 |
| 4,924,699 A | 5/1990 | Kuroda et al. |
| 4,949,268 A | 8/1990 | Nishikawa et al. .......... 364/449 |

(List continued on next page.)

FOREIGN PATENT DOCUMENTS

| DE | 43 42 171 A1 | 5/1994 |
| DE | 43 04 561 A1 | 8/1994 |
| DE | 195 04 475 A1 | 8/1995 |
| DE | 196 04 812 C1 | 12/1996 |
| EP | 0 406 877 A2 | 7/1990 |

(List continued on next page.)

OTHER PUBLICATIONS

M. O'Connor et al., "Kinematic GPS for Closed Loop control of Farm and Construction Vehicles", Dtd Unknown, pp. 1261–1284, Stanford University.

French web page; http://www.1cpc.fr/LCPC/Moyens.equipments/Equipments/Localisation; Dtd May 2, 2000.

(List continued on next page.)

Primary Examiner—Jeffery Hofsass
Assistant Examiner—Toan Pham
(74) Attorney, Agent, or Firm—McKee, Voorhees & Sease, P.L.C.

(57) ABSTRACT

An apparatus and method for improving the safety of railroad systems of the present invention includes a system for navigating a railroad vehicle over railroad tracks. An attitude sensor is used to dynamically sense the attitude of the railroad vehicle as it travels over a set of railroad tracks. By sensing the attitude of the railroad vehicle, a determination of the condition of the railroad tracks can be made. The apparatus also sensed the position of the railroad vehicle in real time to correlate the sensed attitude with a precise position along the railroad tracks. The navigation system is capable of determining a highly accurate position of the vehicle in real time. The position of the vehicle is also used to navigate the railroad vehicle.

4 Claims, 7 Drawing Sheets

U.S. PATENT DOCUMENTS

| | | | | |
|---|---|---|---|---|
| 5,014,066 | A | 5/1991 | Counselman, III | 342/352 |
| 5,030,957 | A | 7/1991 | Evans | 342/357 |
| 5,036,594 | A * | 8/1991 | Kesler et al. | 33/287 |
| 5,043,902 | A | 8/1991 | Yokoyama et al. | 364/449 |
| 5,075,693 | A | 12/1991 | Mc Millan et al. | |
| 5,093,839 | A | 3/1992 | Kohno et al. | 375/1 |
| 5,132,695 | A | 7/1992 | Dumas et al. | 342/461 |
| 5,143,073 | A | 9/1992 | Dory | 128/660 |
| 5,150,712 | A | 9/1992 | Dory | 128/660 |
| 5,155,490 | A | 10/1992 | Spradley, Jr. et al. | 342/357 |
| 5,166,688 | A | 11/1992 | Moreira | 341/25 |
| 5,177,489 | A | 1/1993 | Hatch | 342/357 |
| 5,194,871 | A | 3/1993 | Counselman, III | 342/357 |
| 5,202,829 | A | 4/1993 | Geier | 364/449 |
| 5,214,757 | A | 5/1993 | Mauney et al. | 395/161 |
| 5,220,876 | A | 6/1993 | Monson et al. | 111/130 |
| 5,274,329 | A | 12/1993 | Knuttel et al. | 324/307 |
| 5,291,412 | A | 3/1994 | Tamai et al. | 364/449 |
| 5,296,861 | A | 3/1994 | Knight | 342/357 |
| 5,299,130 | A | 3/1994 | Ono | 701/25 |
| 5,323,322 | A | 6/1994 | Mueller et al. | 364/449 |
| 5,325,302 | A | 6/1994 | Izidon et al. | 364/461 |
| 5,332,180 | A | 7/1994 | Peterson et al. | 246/122 R |
| 5,344,144 | A | 9/1994 | Canon | 273/138 |
| 5,347,286 | A | 9/1994 | Babitch | 342/359 |
| 5,374,933 | A | 12/1994 | Kao | |
| 5,375,059 | A | 12/1994 | Kyrtsos et al. | 364/449 |
| 5,379,320 | A | 1/1995 | Fernandes et al. | 375/1 |
| 5,382,957 | A | 1/1995 | Blume | 342/43 |
| 5,384,574 | A | 1/1995 | Counselman, III | 342/357 |
| 5,386,727 | A | 2/1995 | Searle | 73/602 |
| 5,390,124 | A | 2/1995 | Kyrtsos | 364/449 |
| 5,390,125 | A | 2/1995 | Sennott et al. | 364/449 |
| 5,392,052 | A | 2/1995 | Eberwine | 342/357 |
| 5,420,593 | A | 5/1995 | Niles | 342/357 |
| 5,422,814 | A | 6/1995 | Sprague et al. | 364/449 |
| 5,430,654 | A | 7/1995 | Kyrtsos et al. | 364/449 |
| 5,433,111 | A | 7/1995 | Hershey et al. | 246/169 R |
| 5,438,337 | A | 8/1995 | Aguado | 342/357 |
| 5,438,517 | A | 8/1995 | Sennott et al. | 364/449 |
| 5,442,558 | A | 8/1995 | Kyrtsos et al. | 364/449 |
| 5,517,419 | A | 5/1996 | Lanckton et al. | |
| 5,523,951 | A | 6/1996 | Kriesgman et al. | 701/21 |
| 5,532,690 | A | 7/1996 | Hertel | |
| 5,534,875 | A | 7/1996 | Diefes et al. | 342/357 |
| 5,592,382 | A | 1/1997 | Colley | 701/207 |
| 5,606,506 | A | 2/1997 | Kyrtsos | 701/207 |
| 5,617,317 | A | 4/1997 | Ignagni | 701/215 |
| 5,623,244 | A | 4/1997 | Cooper | 246/167 R |
| 5,627,508 | A * | 5/1997 | Cooper et al. | 340/425.5 |
| 5,657,025 | A | 8/1997 | Ebner et al. | 345/357 |
| 5,682,139 | A | 10/1997 | Pradeep et al. | |
| 5,721,685 | A | 2/1998 | Holland et al. | |
| 5,740,547 | A | 4/1998 | Kull et al. | |
| 5,745,868 | A | 4/1998 | Geier | |
| 5,748,145 | A | 5/1998 | Talbot et al. | |
| 5,791,063 | A * | 8/1998 | Kesler et al. | 33/651 |
| 5,867,404 | A * | 2/1999 | Bryan | 364/550 |
| 5,928,309 | A | 7/1999 | Korver | |
| 5,956,664 | A * | 9/1999 | Bryan | 702/184 |
| 5,970,438 | A * | 10/1999 | Clark et al. | 702/184 |
| 5,978,717 | A * | 11/1999 | Ebersohn et al. | 701/19 |
| 5,986,547 | A * | 11/1999 | Korver et al. | 340/500 |
| 5,987,979 | A * | 11/1999 | Bryan | 73/146 |
| 6,064,428 | A * | 5/2000 | Trosino et al. | 348/128 |
| 6,070,673 | A | 6/2000 | Wendte | |

FOREIGN PATENT DOCUMENTS

| | | |
|---|---|---|
| EP | 0 595 685 A1 | 10/1993 |
| EP | 0-574-009 | 12/1993 |
| EP | 0 716 315 A1 | 6/1996 |
| EP | 0 736 441 A1 | 10/1996 |
| FR | 2 669 118 A1 | 11/1990 |
| FR | 2 703 200 A1 | 3/1993 |
| FR | 2 708 117 A1 | 6/1993 |
| GB | 2 274 170 | 7/1994 |
| JP | 3-4704 | 1/1991 |
| JP | 04164277 | 9/1992 |
| JP | 6-225231 | 8/1994 |
| JP | PCT/JP94/02086 | 12/1994 |
| SU | 1624449 A1 | 1/1991 |
| SU | 1661826 A1 | 7/1991 |
| SU | 1693602 A1 | 11/1991 |
| WO | WO 91/09375 | 6/1991 |
| WO | PCT/US94/09536 | 3/1995 |
| WO | WO 95/18432 | 7/1995 |
| WO | WO 98/36288 | 8/1998 |

OTHER PUBLICATIONS

Dialog 02438873; Aguado et al; US 5,438,337; Iss. 08/1995; pp. 1–9.

Dialog 02419108; Niles et al; US 5,420,593; Iss. 05/1995; pp. 9–12.

Dialog 02311128; Mueller et al; US 5,323,322; Iss. 06/1994; pp. 12–20.

Dialog/Derwent 010329810; Matsumoto, et al; WO 9516895 Abstract; Dtd Jun. 22, 1995; p. 20.

Dialog/Derwent 010313621; Sprague, et al; US 5,422,814 Abstract., Dtd Jun. 1995; p. 21.

Dialog/Derwent 010305188; Niles; US 5,420,593 Abstract; Dtd 05/1995; pp. 21–22.

Dialog/Derwent 010238449; Aguado; WO 9508778 Abstract; Dtd 03/1995; pp. 22–23.

Dialog/Derwent 01089184; Christensen; U.S 5,390,25 Abstract; Dtd 02/1995; pp. 23–24.

Dialog/Derwent 010187355; Dmitrov, et al; RU 2015544 Abstract;Dtd 06/1994; p. 24.

Dialog/Derwent 010167579; Ben Yair; FR2708117A Abstract; Dtd 06/1994; pp. 24–25.

Dialog/Derwent 010165287; Blume; US 5,382,957 Abstract; Dtd 01/1995; pp. 25–26.

Dialog/Derwent 010098909; Burgener; CA 2093457 Abstract; Dtd 10/1994; pp. 26–27.

Dialog/Derwent 010030718; JP 06225231; Dtd 08/1994; p. 27.

Dialog/Derwent 010025968; Babitch;US 5,347,286 Abstract; Dtd 09/1994; pp. 27–28.

Dialog/Derwent 009988414; Hoffman;DE 4,304,561 Abstract; Dtd 08/1994; pp. 28–29.

Dialog/Derwent 009941223; Izidon, et al; US 5,325,302 Abstract; Dtd 06/1994; pp. 29–30.

Dialog/Derwent 009925143; Kyrtsos; DE 4340955; Dtd 06/1994; US 5,390,124, Dtd 02/1994 pp. 30–31.

Dialog/Derwent 009888968; Durrstein, et al; DE 4,342,171 Abstract; Dtd 05/1994; pp. 31–32.

Dialog/Derwent 009610307; Liebkel; Au 9332824 Abstract; Dtd 08/1993; p. 32.

Dialog/Derwent 009346175; JP 914704; Dtd 12/1992; p. 33.

Dialog/Derwent 009289668; Geier;EP 518146 Abstract; Dtd 12/1992; pp. 33–34.

Dialog/Derwent 009238264; Spradley, et al; US 5,155,490 Abstract; Dtd 10/1992 p. 34–35.

Dialog/Derwent 009108641; Regnault; FR 2,669,118 Abtract; Dtd 05/1992; pp. 35–36.

Dialog/Derwent 009002822; Borodin, et al; SU 1,661,826 Abstract, Dtd 07/1991; p. 36.

Dialog/Derwent 008969178; Kohno, et al; US 5,093,839 Abstract; Dtd 03/1992; p. 37.

Dialog/Derwent 004693362; Evans;US 4,599,620; Abstract; Dtd Jul. 1986; US 6,678,187 Abstract; Dtd 09/1986; p. 38.

Dialog/Derwent 004198448; Calabria; US 6,412,466 Abstract;Dtd 10/1984; p. 39.

Dialog 102439053; Sennott, et al; US 5,438,517; Iss. 08/1995; pp. 39–42.

Dialog 02385278; Sennott, et al; US 5,390,125; Iss. 02/1995; pp. 42–52.

Dialog 02385277; Kyrtsos, et al US 5,390,124;; Iss. 02/1995; pp. 52–57.

Dialog 02373142; Fernandes, et al; US 5,379,320; Iss 01/1995; pp. 57–81.

Dialog 0236405; Kyrtsos, et al; US. 5,375,059; Iss. 12/1994; pp. 81–92.

Dialog 02194903, Monson, et al; US 5,220,87;ISS. 06/1993; pp. 92–96.

Dialog 02187928; Mauney, et al; US 5,214,757; Iss 05/1993; pp. 96–101.

Dialog 021784835; Geier, et al; US 5,202,829; Iss. 04/1993; pp. 101–104.

Dialog 02166115; Counselman, III, et al US 5,194,871;; ISS 03/1993; pp. 104–113.

Dialog 02146950; Hatch, et al US 5,177,489;; Iss –1/1993; pp. 113–116.

Dialog 02135107; Moreirs, et al; US 5,166,668; Iss. 11/1992 pp. 116–119.

Dialog 01969530; Counselman, III, et al; US 5,014,066; Iss. 05/1991; pp. 119–123.

Dialog/Derwent 01097032; Eberwine US 5,392,052 Abstract;; Dtd 02/1005; p. 123.

Dialog/Derwent 010044533; Obadia, FR 2,703,200 Abstract; et al; Dtd 09/1994; p. 124.

Dialog/Derwent 010017489; Canon; US 5,344,144 Abstract; Dtd 09/1994; pp. 125–126.

Dialog/Derwent 009934918; Kundu;GB 2,274,170 Abstract; Dtd 07/1994; pp. 126–129.

Dialog/Derwent 009866350; Vilge; EP 595685 Abstract; Dtd 05/1994; p. 127.

Dialog/Derwent 009519502; Bauer, et al; US 5,220,876 Abstract; Dtd 06/1998; p. 128–129.

Dialog/Derwent 009170694; Ganushkin et al; SU 1,693,602 Abstract; Dtd 11/1991; p. 129.

Dialog/Derwent 008863875; Akterskii, et al; SU 1,624,449 Abstract; Dtd –01/1991; pp. 129–130.

Dialog/Derwent 008505788; Moreira; EP 406877 Abstract; Dted 01/1991; US 5,166,688 Abstract; Dtd 11/1992; EP 406877 Abstract; Dtd 04/1995; DE 3922428 Abstract; Dtd 01/ 1991(cited); pp. 130–132.

Dialog/Derwent 008449058; Kimminch, et al; DE 3914301 Abstract; Dtd 01/1991(cited), US 5274329 Abstract; Dtd 12/1993; pp. 132–133.

Dialog/Derwent 00805445; Dory; EP 339693 Abstract; Dtd 11/1989; US 5143073 Abstract; Dtd 09/1992; US 5150712 Abstract; Dtd 09/1992; pp. 134–135.

Dialog/Derwent 007964341; Dumas; EP 327447 Abstract; Dtd 08/1989; US 5132695 Abstract; Dtd 07/ 1992; pp. 136–137.

P. Daum et al., Aided Intertial Land Navigation System (ILANA) with a Minimum Set of Inertial Sensors, Position Location and Navigation Symposium (PLANS), Las Vegas, Apr. 11–15, 1994, Apr. 11, 1994, Institute of Electrical and Electronics Engineers, pp. 284–291, XP000489353 (see P. 284, right hand column).

Ash et al., "GPS/Inertial Mapping (GIM) System for Real Time Mapping of Roadways Using WADGPS", 1995, pp. 1825–1828, ION Fall Meeting, Palm Springs, CA.

* cited by examiner

APPARATUS AND METHOD FOR IMPROVING THE SAFETY OF RAILROAD SYSTEMS This is a continuation of application Ser. No. 08/811,128 filed on Mar. 3, 1997, now U.S. Pat. No. 5,986,547.

BACKGROUND OF THE INVENTION

1. Field of the Invention

The present invention relates to the railroad industry. More particularly, though not exclusively, the present invention relates to a system for navigating a railroad vehicle car over a set of railroad tracks.

2. Problems in the Art

The largest hazard in the railroad industry is train derailments. Each train derailment can cost a railroad company in excess of $1 million in property damage and repair.

The most common cause of train derailments is faulty railroad tracks. After a length of railroad tracks is used over a long period of time or set on unstable grounds, the rails may not provide the train cars with a solid and even surface. A typical railroad track consists of a pair of parallel iron rails mounted to a plurality of wooden railroad ties placed perpendicular to the rails one after the other. The rails are each secured to the ties. The ties are each placed directly on a ground surface. A number of conditions can cause the rails to become uneven or unsolid. Those conditions include worn ties or rails, settling ground, erosion, faulty construction, and other factors. These conditions can be worse on tracks having a high amount of train traffic or tracks having traffic with heavy loads.

A potential hazard exists when the rails become uneven. When the rails of a railroad track are uneven, a train car traveling over the tracks will tend to lean towards the side of the track with the lower rail. As a train travels along the tracks, the train cars may wobble back and forth because of the uneven rails. This condition is the most common cause of train derailments.

Equipment exists in the prior art to repair railroad tracks that are set on settled ground, worn, or not set properly. One such device is commonly known as a rail tamper which is used to reset railroad tracks. However, rail tampers are very expensive (millions of dollars) and therefore can be prohibitively expensive considering the length of railroad tracks across the country. While isolated spots along railroad tracks can be repaired by tampers, it is not practical to reset entire lengths of tracks.

There is no method known in the prior art to determine where the railroad tracks are hazardous. Even if there were a way to determine if one individual section of tracks were bad, this would have to be determined over very short intervals (a few feet) along the entire distance of the track since one bad spot can cause a derailment.

Another problem in the rail industry deals with the navigation of trains. Since a plurality of trains use the same sets of tracks, a hazard exists when two different trains occupy the same track with a close proximity to each other. In order to reduce the risk of a collision, railroad companies will try to keep track of where each train is in order to avoid collisions. Prior art attempts to navigate trains include using global positioning system (GPS) receivers or transponder/interrogator schemes.

Both of these prior art navigation systems have limitations. With a transponder/interrogator system, a number of transponders are placed on the railroad tracks at certain places along the track. An interrogator device is installed on the train and can determine when the train has passed over a transponder. One common failure with this system is caused by misplaced transponders. This may result from vandalism, maintenance errors, etc. Transponders can also be damaged from dragging equipment or weather conditions. The transponders will also become covered with snow or ice during cold weather seasons. This effects the ability of the transponder/interrogator to function properly. The transponder/interrogator system is also limited by the number of transponders used. It is prohibitively expensive to include enough transponders to achieve a high level of accuracy. To alleviate this problem, prior art systems use devices such as odometers allow the train to estimate where it is when it is between transponders. This still results in a system without the accuracy and reliability desired.

Using a GPS receiver to navigate a train also has disadvantages. The use of GPS receivers as a navigator is limited by terrain, foliage, and satellite geometry relative to the terrain and the vehicle. A GPS receiver will be unable to track satellites when the train is traveling through a tunnel or under a bridge. Similarly, when traveling near mountains, buildings, and track side foliage, the satellites may be blocked from view. As a result, like with the transponders, the user must rely on on-board odometers to determine a current location. In addition to these problems are various problems that are inherent with GPS which are known in the art. Using a GPS receiver as a primary navigator intensifies these problems. A GPS position calculation has a lag time. As a result, the position solution provided by a GPS receiver tells a user where the vehicle was a moment ago rather than in real time. Another problem with GPS systems are the errors resulting from the antenna lever arm problem. A GPS antenna typically is a certain distance away from the GPS receiver. Since the GPS antenna is the collection point of the GPS signals received, the position solution will not accurately describe the position of the GPS receiver or some other reference point. If the geometrical distance between the GPS receiver or reference point and the GPS antenna is known, the position of the reference point may be calculated. However, as a ground based vehicle travels over uneven terrain such as terraces, slopes, ruts, bumps, etc., the actual position of the GPS antenna cannot be determined resulting in erratic GPS position solutions.

Most prior art attempts to use a GPS navigation system attempted to deal with GPS problems by correcting GPS drift and lag time. However no prior art system navigating by GPS has achieved the high accuracy and real time solutions required for applications requiring a high level of accuracy. The prior art attempts have not provided an adequate solution because GPS does not provide a continuous navigation solution. A GPS system will update its position periodically, not in real time, and a lag time is still involved. Another problem with a GPS system is the possibility of a signal dropout of the satellite signals. The accuracy of a GPS system is also limited due to the errors caused by the ionosphere. Another problem with GPS systems is that altitude data provided by a GPS receiver is not precise.

FEATURES OF THE INVENTION

A general feature of the present invention is the provision of navigation system for a rail vehicle which solves problems found in the prior art and reduces the risk of accidents in railroad systems.

A further feature of the present invention is the provision of a navigation system which is used sense the attitude of a rail vehicle to determine hazardous spots on railroad tracks.

A further feature of the present invention is the provision of a navigation system for a rail vehicle which senses the position of the rail vehicle using an inertial system with a radio navigation receiver to correct for drift errors of the inertial system.

A further feature of the present invention is the provision of a navigation system for a rail vehicle which senses the attitude and position of the rail vehicle in real time.

A further feature of the present invention is the provision of a navigation system for a rail vehicle which senses the attitude of the rail vehicle and stores that value in memory.

A further feature of the present invention is the provision of a navigation system for a rail vehicle which accurately determines the position of the rail vehicle in real time.

A further feature of the present invention is the provision of a navigation system which reduces the risk of train derailments by locating hazardous spots along the railroad tracks.

A further feature of the present invention is the provision of a navigation system using inexpensive sensors to achieve highly accurate results.

These as well as other features of the present invention will become apparent from the following specification and claims.

SUMMARY OF THE INVENTION

The present invention relates to a method and apparatus for improving the safety of railroad systems. A railroad vehicle is provided on a set of railroad tracks. The attitude of the railroad is then determined to determine the condition of the railroad tracks at that location.

Optionally, the user of the apparatus can selectively repair or replace portions of railroad tracks based on the determined condition of the railroad tracks. The invention may also optionally be used to dynamically determine the accurate value for the location of the railroad vehicle.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
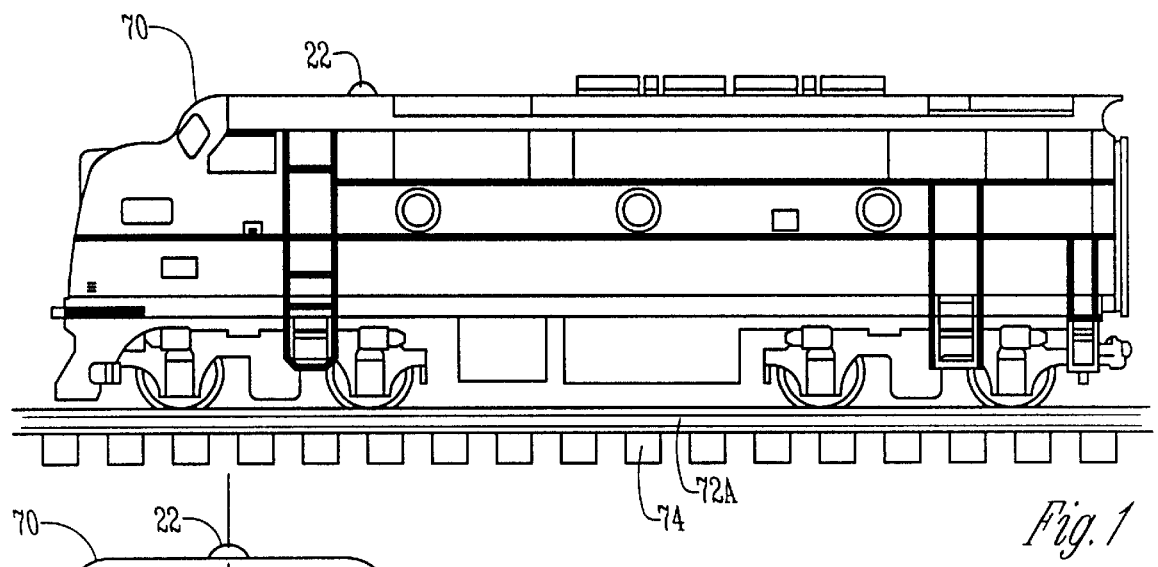
FIG. 1 is a perspective view of a train traveling over a set of railroad tracks.

FIG. 1 shows a train engine 70 traveling on a railroad track consisting of a pair of rails 72A and 72B mounted on a plurality of railroad ties 74. Installed in the engine 70 is a navigation system 10 which is shown in detail in FIGS. 4–8 and described in detail below. The navigation system 10 has two primary functions. First, the navigation system 10 uses an inertial navigator to sense the attitude of the host vehicle, in this case the train engine 70. Note that the host vehicle could be any type of vehicle which is capable of traveling over railroad tracks. Second, the navigation system 10 uses a dead reckoning navigator to determine the location of the engine 70 at any time. While the preferred embodiment includes a navigation system using a radio navigation receiver (discussed below), the attitude sensor does not necessarily rely on the radio navigation sensor.

An engine 70 having a navigation system 10, is capable of accurately determining the attitude of the engine in real time in order to determine the condition of the railroad tracks over which it is traveling. The attitude sensed by the system 10 is used to calculate the difference between the heights of the rails 72A and 72B. If one of the rails is significantly lower than the other, a rail car such as engine 70 traveling over the rails 72A and 72B will tip while traveling over this portion of the railroad tracks. Since most train derailments occur because of worn, settled, or uneven tracks, by identifying where the rails are uneven, the hazardous spots along the railroad tracks can be identified.

Figure 2A:
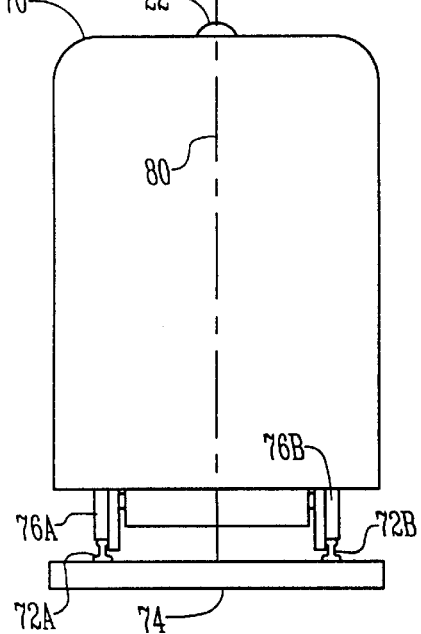
FIG. 2A is an end view of a railroad car positioned on a pair of even rails.
Figure 3A:
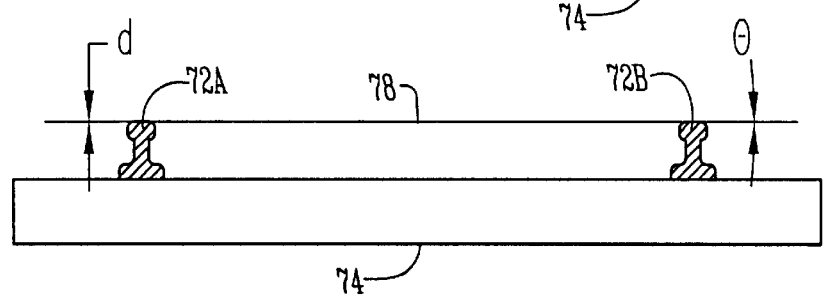
FIGS. 3A–3C show enlarged cross-sectional views of the rails shown in FIGS. 2A, 2B and 2C, respectively.

FIG. 2A shows an end view of a rail car 70 with its wheels positioned on the rails 72A and 72B. The rails 72A and 72B are mounted on the railroad ties 74. FIG. 3A shows an enlarged cross section of the railroad tie 74 and the rails 72A and 72B shown in FIG. 2A. A horizontal reference line 78 is shown in FIG. 3A extending from the top of rail 72A to the top of rail 72B. As shown, the two rails 72A and 72B are even. This results in the rail car 70 being positioned as shown in FIG. 2A. Line 80 in FIG. 2A is a vertical reference line which is disposed 90° (perpendicular) from the horizontal reference line 78. The rails 72 and tie 74 shown in FIGS. 2A and 3A are examples of non-hazardous railroad tracks since the angle θ is zero and the distance d is zero.

In contrast, FIGS. 2B, 2C, 3B, and 3C show hazardous railroad tracks.

Figure 2B:
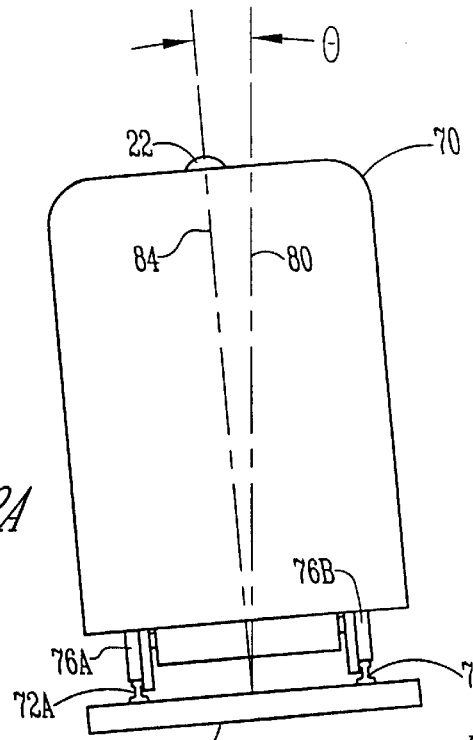
FIG. 2B is an end view of a railroad car sitting on a pair of uneven rails.
Figure 3B:
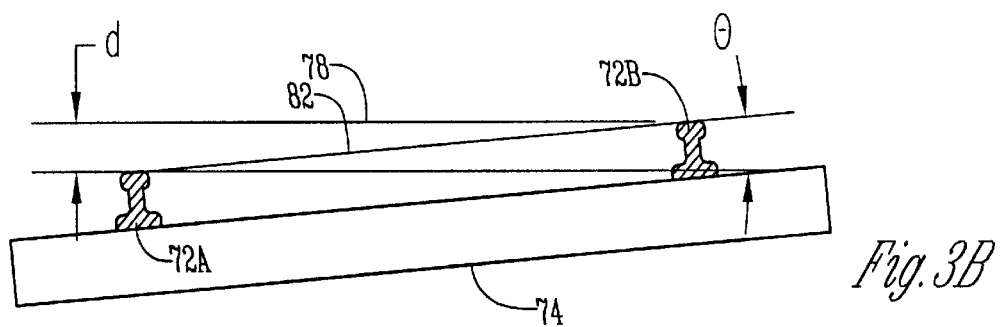

FIG. 3B shows a cross section of the rails 72A and 72B and railroad tie 74 shown in FIG. 2B. As can be seen in FIG. 3B, the horizontal reference line 78 is even with the top of rail 72A but not rail 72B. This results in the rails 72A and 72B being uneven by a distance d. FIG. 3B also shows a reference line 82 extending from the top of rail 72A to the top of rail 72B. Reference line 82 is disposed at an angle θ from the horizontal reference line 78. This results in the rail car 70 being positioned as shown in FIG. 2B. As shown in FIG. 2B, the center line 84 of the rail car 70 is at angle θ from the vertical reference line 80. If the angle θ and/or the distance d is great enough, then the section of railroad tracks shown in FIGS. 2B and 3B would be considered hazardous and would be in need of repair.

Figure 2C:
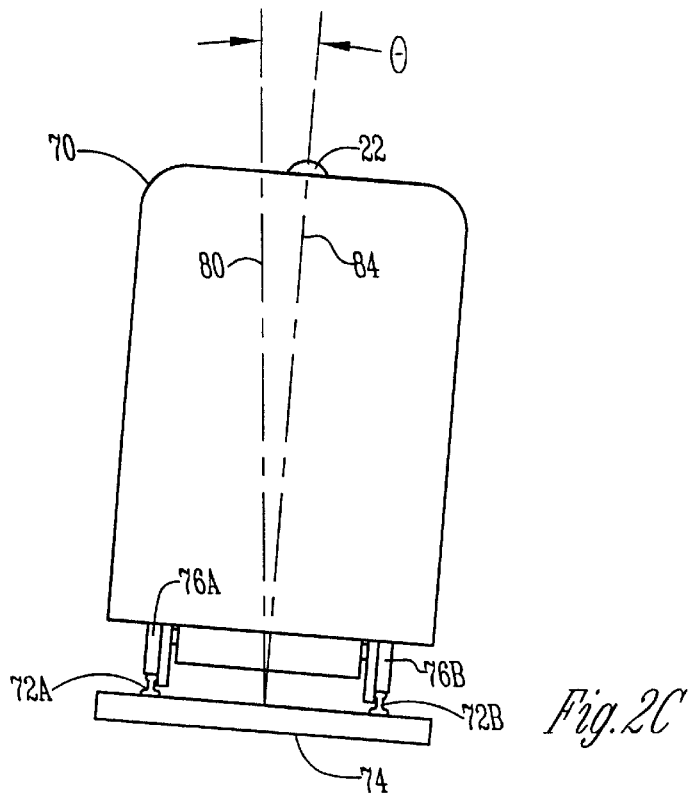
FIG. 2C shows the view of FIG. 2B except with the rails being uneven in the opposite direction.
Figure 3C:
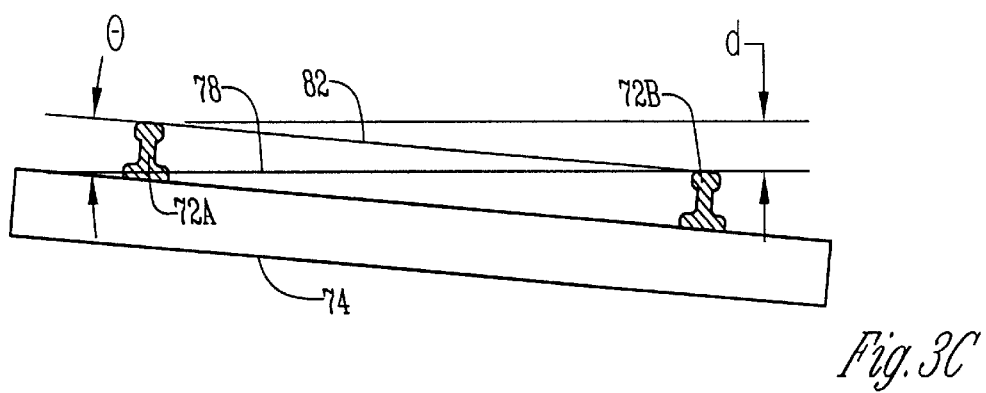

FIG. 3C shows a cross section of the rails 72A and 72B and railroad tie 74 shown in FIG. 2C. FIGS. 3C and 2C are similar to FIGS. 3B and 2B, but show the angles in opposite directions. As can be seen in FIG. 3C, the horizontal reference line 78 is even with the top of rail 72B but not rail 72A. This results in the rails 72A and 72B being uneven by a distance d. FIG. 3C also shows a reference line 82 extending from the top of rail 72A to the top of rail 72B. Reference line 82 is disposed at an angle θ from the horizontal reference line 78. This results in the rail car 70 being positioned as shown in FIG. 2C. As shown in FIG. 2C, the center line 84 of the rail car 70 is at angle θ from the vertical reference line 80. If the angle θ and/or the distance d is great enough, then the section of railroad tracks shown in FIGS. 2C and 3C would be considered hazardous and would be in need of repair.

As can be seen from FIGS. 2A–3C, if the angle θ or distanced for a particular portion of railroad tracks is known, that portion can be labeled as hazardous or non-hazardous or simply recorded to keep a record of the condition of various portions of the tracks.

The criteria for labeling a track hazardous or non-hazardous depends on many factors including the type of soil the tracks are set on, the amount of train traffic, the type of train traffic (heavy or light, for example), and many other factors. As a result, the tolerable distance d or angle θ will vary. A railroad company using the present invention may not even label parts of the tracks as being hazardous or non-hazardous, but rather would keep a record of the data collected by the present invention to determine which tracks to repair or replace or to determine how various factors effect the conditions of the tracks.

The navigation system 10 of the present invention includes an inertial system including gyros and accelerometers. This is described in detail below. By accurately sensing the attitude of the rail car 70 as the rail car 70 passes over the railroad tracks, the condition of the tracks can be determined. By knowing the attitude of the rail car 70, the angle θ or distance d can easily be determined. Since the navigation system 10 can also accurately determine the position of the host vehicle in real time, the sensed attitude at any time can be correlated to a specific location. As a result, as the rail car 70 travels over the railroad tracks, the navigation system 10 can store values for the vehicle attitude and correlate those values to a specific location along the railroad tracks. In this way, a railroad company can have detailed data indicating the condition of the railroad tracks at any position along the tracks. This method of determining the condition of railroad tracks can be even further refined by repeatedly recording and storing the sensed attitude along the tracks and comparing it to previously recorded data.

In this way, a railroad company may keep a record of the rate at which specific portions of track deteriorate, thereby being able to predict when tracks need to be replaced or repaired. Since tracks can be repaired before they are bad enough to cause a derailment, train derailments can be significantly reduced.

Since the navigation system 10 is capable of sensing the host vehicle's position in real time, the navigation system 10 is a navigator. Since there is a need for trains to be interoperable among railroads requires that a location system be adopted. It is important to know the precise locations of trains along railroad tracks in order to avoid collisions between different trains using the same tracks. Along with other problems, prior art navigation systems are typically not accurate enough to discern between two parallel railroad tracks. In other words, even if a system is accurate enough to indicate generally where along a track a train is, if two tracks run parallel to each other, the prior art navigation system cannot determine which track the train is on. The navigation system 10 of the present invention is accurate enough to discern between two parallel tracks. The navigation system will continue to operate even while the trains go trough tunnels or under foliage, etc. In addition, the railroads could fit more trains on a given track if they knew precisely where each train was located.

The following description describes in detail how the navigation system 10 works.

The navigation/guidance system 10 of the present invention is a dead reckoning navigator which uses periodic GPS fixes to correct the drift of the inertial system. The system uses GPS antenna attitude compensation to improve the accuracy of the GPS fixes. The system primarily uses speed sensed by Doppler radar and attitude and heading sensed by a set of gyros. As discussed above, systems using a Doppler sensor and gyros have the problem of errors in the sensors. In addition, in order to use inexpensive sensors, very large errors are encountered. The system 10 uses various processes to compensate for the errors. The heading sensed by the gyros is aided by a magnetic heading compass and a GPS receiver. The speed sensed by the Doppler radar is also aided by the GPS receiver. The system also uses accelerometers to improve the accuracy of the system. A set of horizontal accelerometers measure the roll and pitch of the vehicle. This is used to provide the attitude integration algorithm (discussed below) with the vehicle horizontal rotations to more accurately calculate the attitude and heading.

Figure 4:
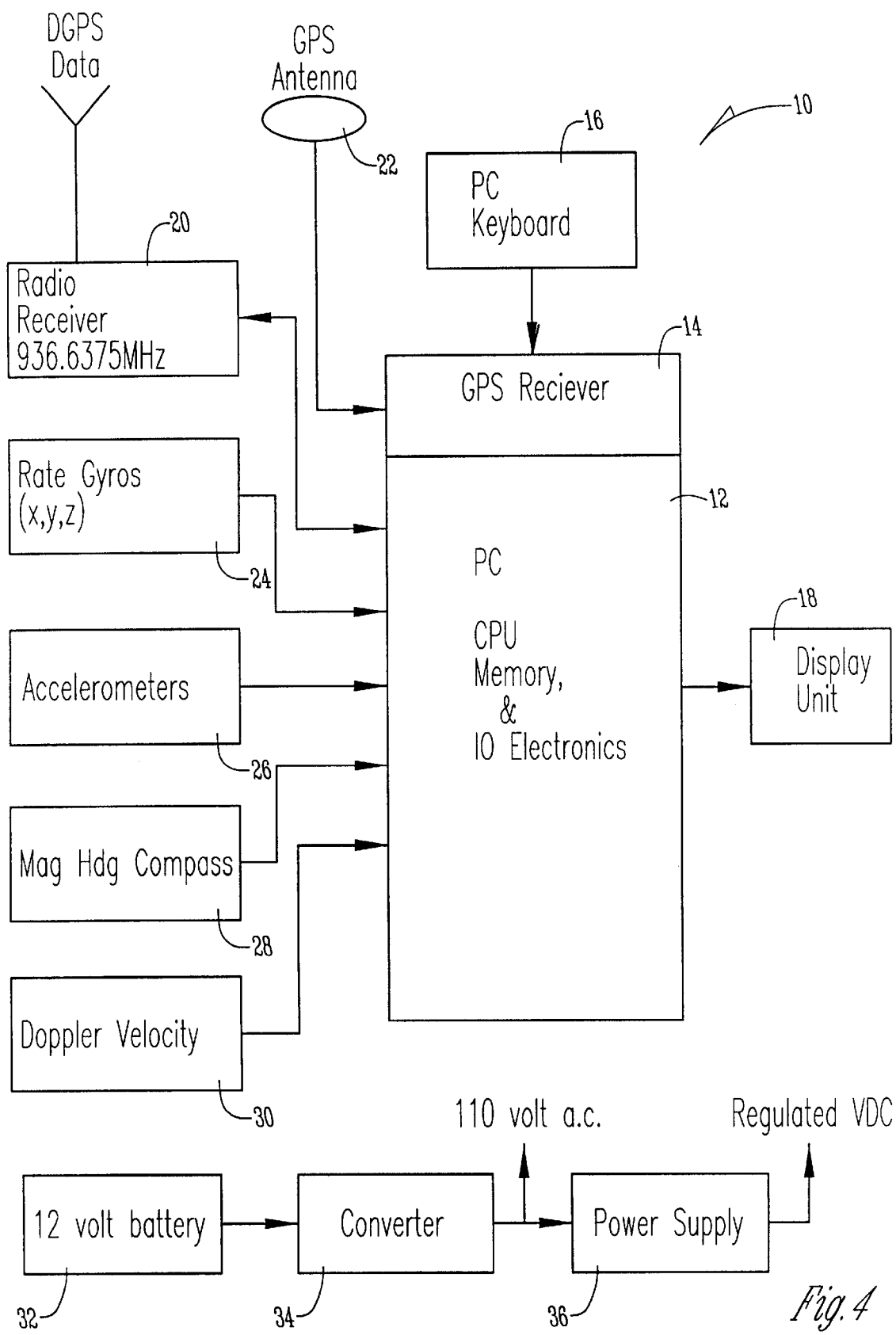
FIG. 4 shows a block diagram of the primary hardware elements of the navigation/guidance system of the present invention.

FIG. 4 shows the primary hardware elements of the inertial navigation/guidance system 10 of the present invention. The system 10 is comprised of a personal computer (PC) 12 which includes a CPU, memory and input/output electronics. Although the embodiment shown in the drawings shows a personal computer, the invention could use a processor circuit that includes a CPU, memory, and input/output electronics on a single processor card. A GPS receiver 14 plugs directly into an open PC expansion slot. Any GPS receiver suitable for use with the present invention may be used, however the preferred GPS receiver is the NovAtel GPS receiver card #951R. Alternatively, the system 10 could simply have a connector that would receive GPS data from any existing GPS receiver. Any other type of radio navigation system or combination of systems could be substituted for the GPS system such as LORAN, GLONASS, etc. A keyboard or keypad 16 is connected to the PC 12 and is used as a user interface to input data or control the system 10. A display unit 18 is also connected to the PC 12. The display unit 18 is used to display various information to a user. The display unit 18 could take on many forms, but is preferably comprised of a CRT display. The display unit could even be comprised of a display screen that shows the operator a graphic of the surrounding area including the railroad tracks and could indicate where the vehicle has been and where it is going. All sensor input data to the PC 12 will be digital serial. If any of the selected sensors provide only analog outputs, A/D converters will be used where required to obtain the appropriate input data formats. Also shown in FIG. 4 is a block diagram of the power supply circuit used by the present invention. The power supply circuit includes a 12 volt battery 32, a voltage converter 34 and a power supply 36. The power supply circuit provides the system 10 with 110 volts AC and a regulated DC voltage.

A portable DGPS receiver 20 is also connected to the PC 12. The DGPS radio receiver 20 receives DGPS data for use by the PC to overcome the effects of Selective Availability (SA) as well as other imperfections in the time-coded signals broadcast by the NAVSTAR satellites. The use of DGPS provides a more accurate location solution than GPS alone. The GPS radio receiver 20 may be any type of DGPS receiver suitable for use with the present invention but is preferably the Smartbase model number 10, manufactured by Premier GPS Inc. Also note that the present invention would work without using DGPS, although the accuracy may be less. One alternative to the preferred embodiment is to use a receiver that uses a combination of GPS and GLONASS signals to produce a more accurate radio navigation system.

A GPS antenna 22 is connected to the GPS receiver 14 to provide the GPS receiver 14 with GPS signals from the NAVSTAR satellites. The GPS antenna 22 acts as the collection point for GPS signals received by the GPS receiver 14. The GPS antenna 22 is mounted to the host vehicle (for example, on the train engine 70 shown in FIG. 1) at a known location such that the location of the antenna 22 is always known relative to the GPS receiver 14 or some other reference point.

As shown in FIG. 4, a number of sensors are also connected to the PC 12. Three rate gyros 24, three accelerometers 26, and a magnetic heading compass 28 are connected to the PC 12 to provide the system with various data. Preferably, the gyros 24, accelerometers 26 and the magnetic heading compass 28 are assembled together in a single unit. A position change sensor 30, preferably comprised of a Doppler radar is also connected to the PC 12 to provide the system with speed data. Although the preferred embodiment uses three each of the gyros 24 and accelerometers 26, more or less could be used. The choice of using two or three accelerometers depends on such factors as the level of accuracy desired, the application of the system, and the sophistication of the Kalman filter, etc. The gyros 24 act as angular change sensors, so therefore, any device with the same function could be substituted for the gyros 24. The preferred gyros are the model ENV-05H-02 manufactured by Murata Erie Co., Ltd. Similarly, the accelerometers 26 could be substituted by an equivalent device such as an inclinometer, tilt sensors, etc. The preferred accelerometer is the model 02753-01 manufactured by Lucas Control System Products. The magnetic heading compass could also be substituted by any other heading sensor, for example, a fluxgate compass. The preferred magnetic heading compass is the model C100 manufactured by KVH Industries, Inc. Also note that the magnetic heading compass 28 is optional. Depending on the sophistication of the Kalman filter and other factors, the magnetic heading compass 28 may not be needed by the system. The Doppler radar 30 functions as a position change sensor, so therefore any equivalent device could be substituted for the Doppler radar such as an odometer or any other device used to derive the vehicle speed. The preferred Doppler radar is the model Radar II manufactured by Dickey-John.

Figure 5:
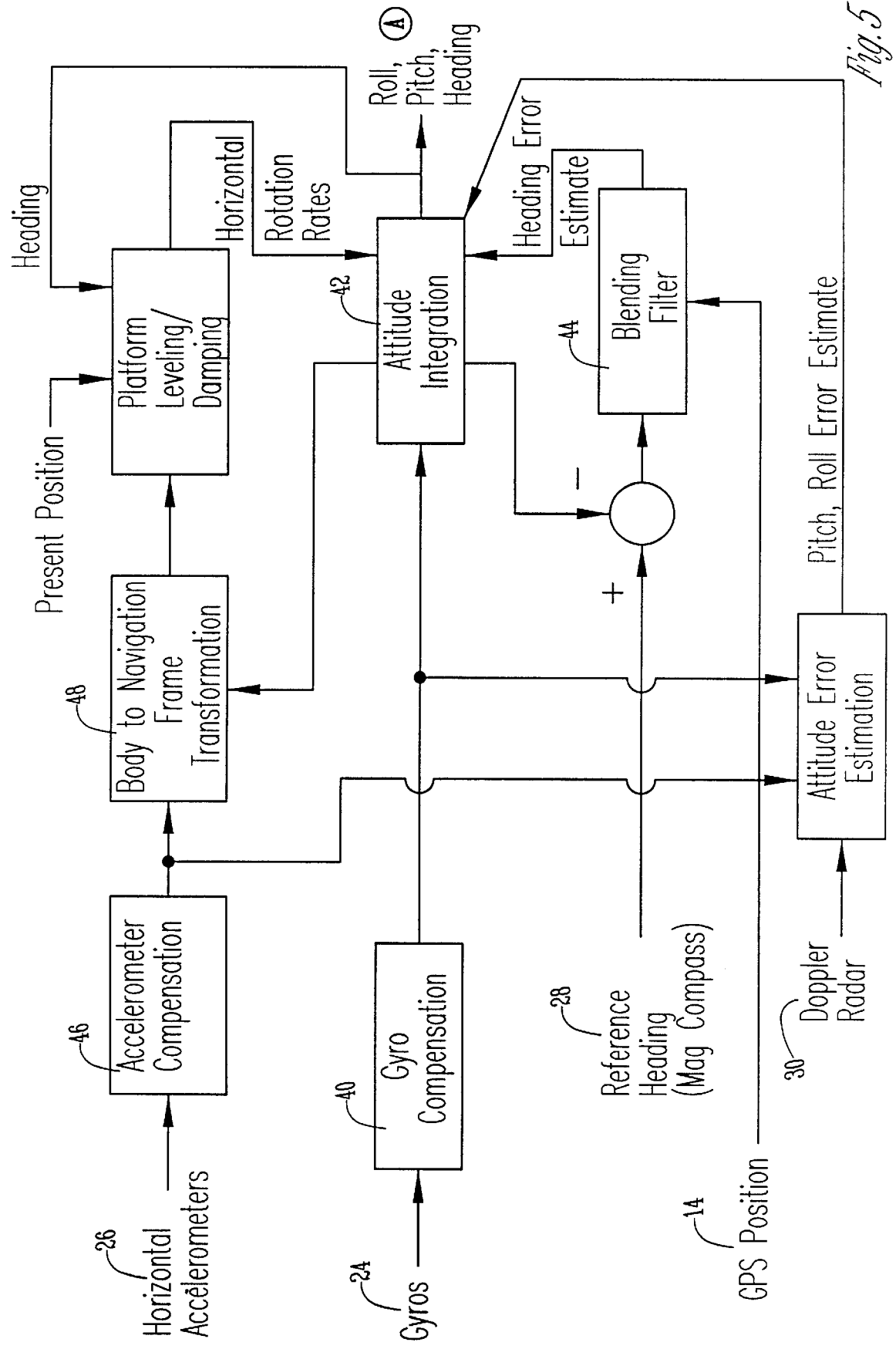
FIG. 5 shows a functional block diagram of the attitude/heading portion of the present invention.

FIG. 5 shows a functional block diagram of the attitude/heading portion of the invention. The navigation/guidance system 10 uses software which performs the functions described and outlined in the figures. As described below, the attitude integration algorithm 42 uses the angular rates from the gyros 24, horizontal accelerations from the horizontal accelerometers 26, and heading and attitude error estimates from the other sensors to calculate a value for the vehicle's attitude (pitch and roll) and heading. The attitude and heading are primarily sensed by the gyros 24. The various sensors are used together as shown in the figures to obtain a more accurate value for attitude (pitch and roll) and heading. The data from the gyros 24 is applied the gyro compensator function 40 which applies constant values such as a scale factor, misalignment and fixed bias to the data and also applies changing values such as an estimated dynamic bias to the data. The data is then provided to the attitude integration algorithm 42 to calculate the attitude and heading. The horizontal accelerometers 26 provide data to the accelerometer compensation function 46 which applies constant values such as scale factor, bias, and misalignments to the data. The compensated data from the accelerometers 26 is then provided to a direction cosine matrix (shown in FIG. 5 as the body to navigation frame transformation function 48) and a platform leveling/damping function 50. The yaw attitude is slaved to the magnetic heading reference supplied by the magnetic heading compass 28. This, along with data from the GPS position are used by a blending filter 44 to provide a heading error estimate to the attitude integration algorithm 42. A pitch and roll error estimate is also provided to the attitude integration algorithm 42. The pitch and roll error estimate is derived from data from the Doppler radar 30, the horizontal accelerometers 26, and the gyros 24.

The attitude, heading and corresponding time are saved in a data table for interpolation to the GPS data time. This interpolated data is required to provide position corrections to the GPS position fix (see discussion of FIG. 6 below) for use in the dead reckoning navigation function shown in FIG. 7 (discussed below).

Figure 6:
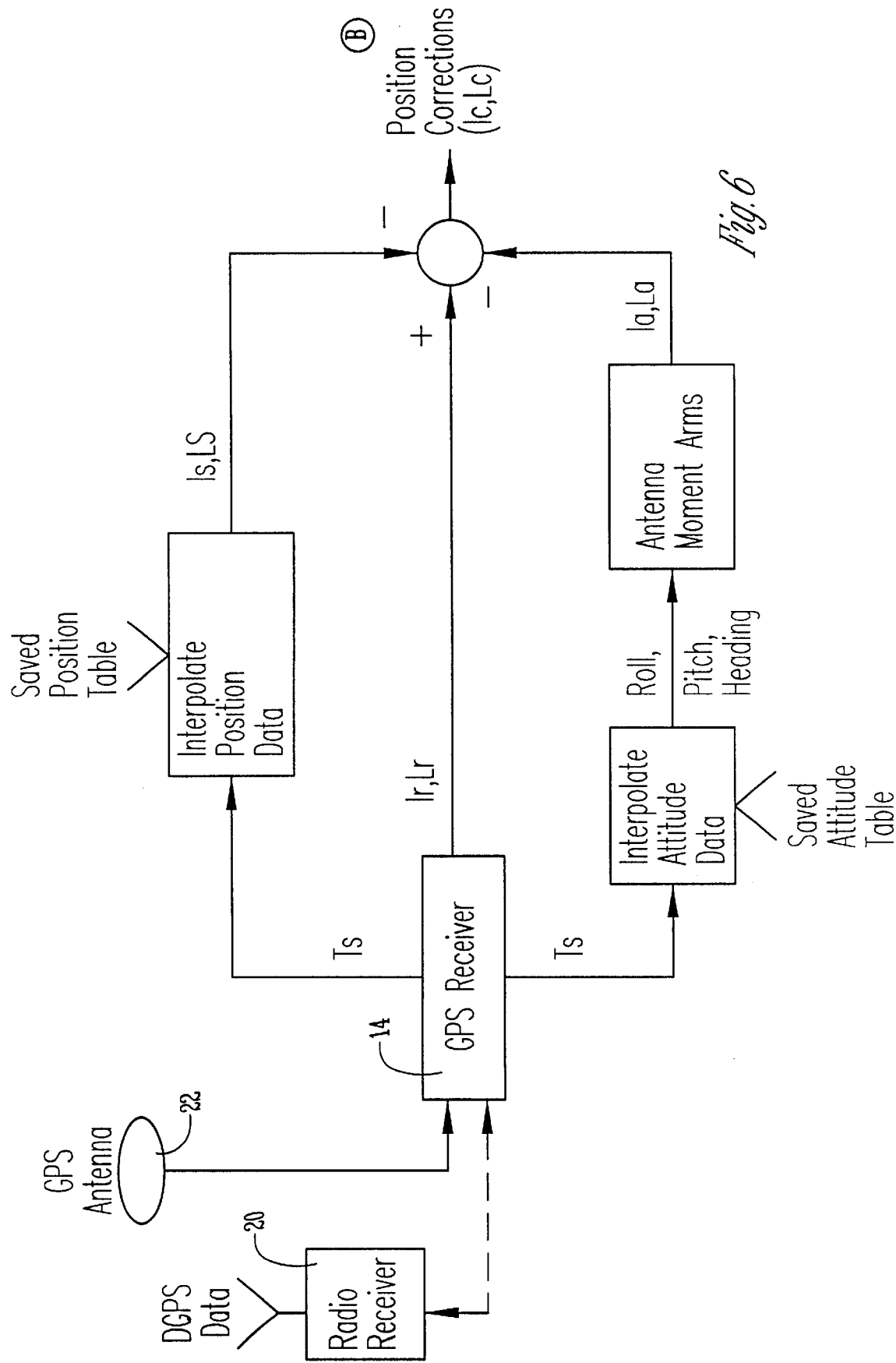
FIG. 6 shows a functional block diagram of the position correction function of the present invention.

FIG. 6 is a block diagram of the position correction function. As described above, the GPS receiver 14 is connected to the GPS antenna 22 to receive GPS data signals from the NAVSTAR satellites. The GPS receiver 14 also receives DGPS data from the DGPS radio receiver 20 to improve the GPS accuracy. The position corrections lc, Lc are calculated based on the latest position lr, Lr provided by the GPS receiver 14, the saved/interpolated dead reckoned position ls, Ls, and the GPS antenna moment arm (lever arm) corrections (discussed below) la, La based on the saved/interpolated attitude data corresponding to the GPS data time.

The system uses the attitude data from the navigation system 10 for GPS antenna lever arm corrections. An antenna mounted on top of a vehicle such as a train 70 would be about 13 feet from the ground and will experience attitude excursions as the vehicle travels over the railroad tracks. As shown in FIG. 6, the system takes this into account by using the attitude data to make GPS position corrections based on the current attitude of the vehicle and the known position of the GPS antenna relative to the vehicle. As a result, as the vehicle travels over uneven tracks or terrain, etc., even relatively large swings of the GPS antenna will not effect the accuracy of the GPS position. Using similar techniques, the position calculated by the system can be transferred to any part of the vehicle.

Figure 7:
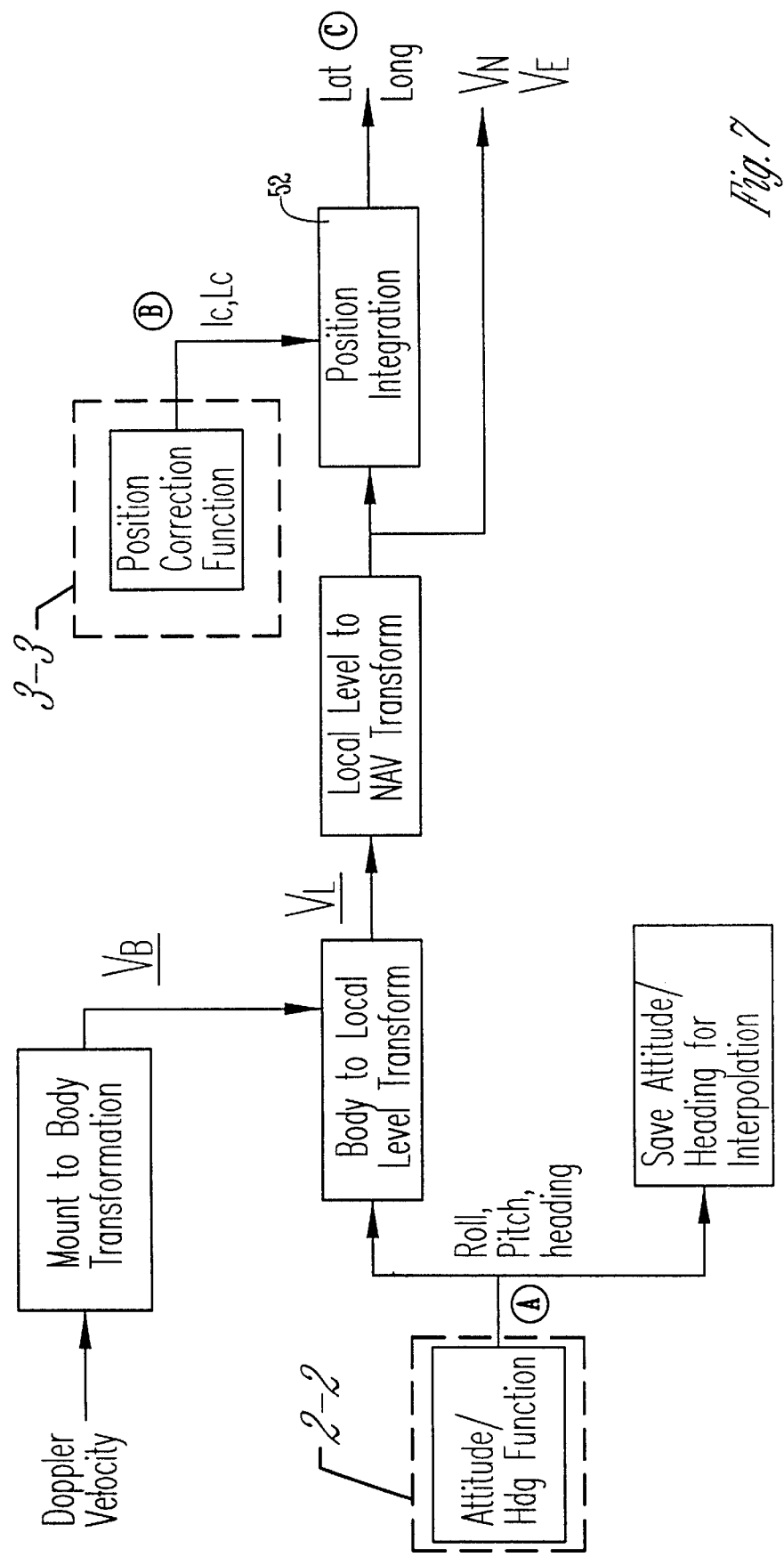
FIG. 7 shows a functional block diagram of the dead reckoning navigation function of the present invention.

FIG. 7 shows a block diagram of the dead reckoning navigation function. The velocity sensed by the Doppler velocity sensor 30 is transformed from mount to body axes, then transformed from body to local level axes using the attitude (pitch and roll) and heading data from the attitude integration algorithm 42 shown in FIG. 5. After the body to local level transform, the velocity is then transformed from local level to north referenced navigation axes. Finally, the data is provided to the position integration function 52 which is reset according to the available position correction values lc, Lc coming from the position correction function shown in FIG. 6.

Figure 8:
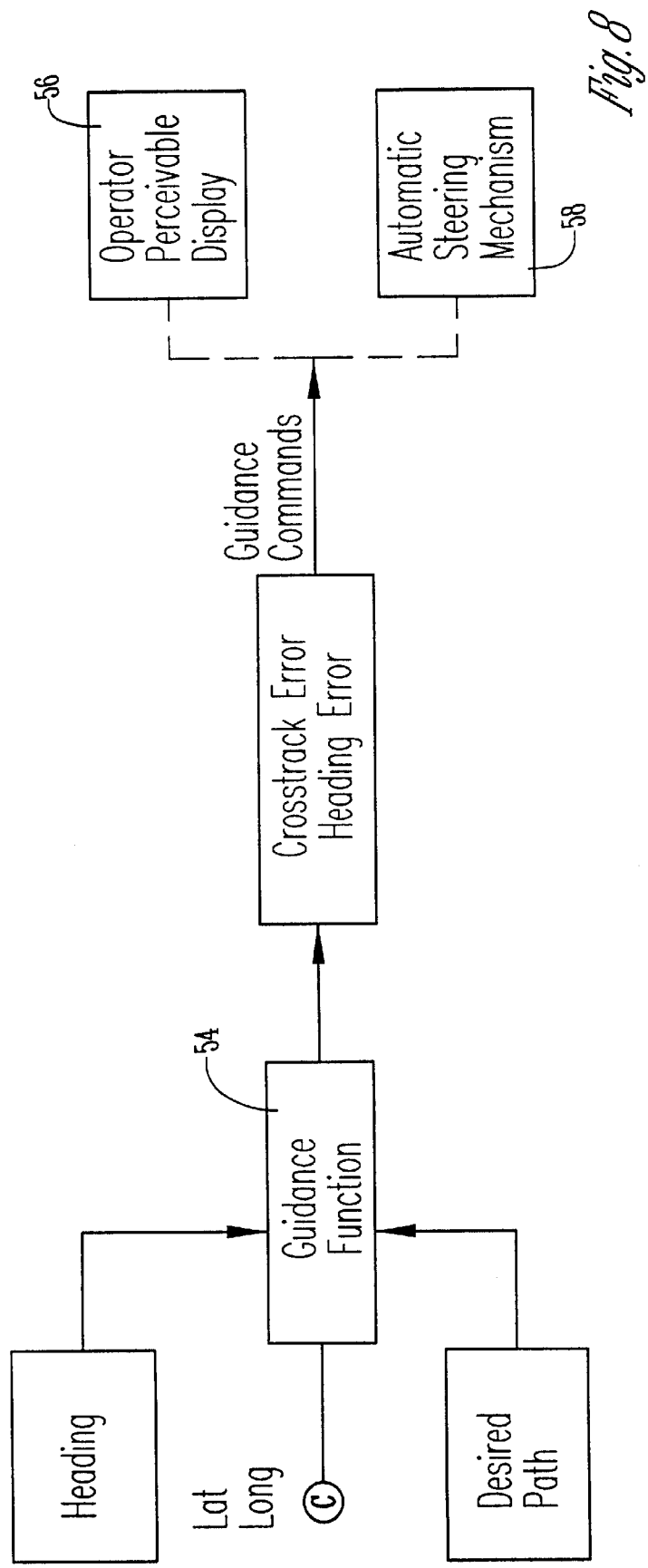
FIG. 8 shows a functional block diagram of the guidance function of the present invention.

FIG. 8 shows a block diagram of the guidance function of the present invention. For use with the preferred embodiment (trains), a guidance system may not be needed. However, other host vehicles, especially vehicles which have a steering mechanism may include the guidance function. As shown in FIG. 8, the position of the vehicle determined by the position integration (FIG. 7) is supplied to a guidance algorithm 54 along with the vehicle's heading and the desired path. The guidance algorithm 54 uses this data to determine the cross track error and the heading error. From the cross track and heading errors, the system creates guidance commands. The guidance commands are provided to an operator perceivable display 56 and/or an automatic steering mechanism 58. The display 56 may take on any form. The display 56 could be display unit 18, a light bar, or any other type of operator perceivable indicator. The automatic steering mechanism 58 could also take on any form. For example, the steering mechanism could be a hydraulic steering mechanism.

The navigation/guidance system of the present invention operates as follows. Before the host vehicle moves, the navigation system will initialize itself. The attitude (pitch and roll) is initialized by the accelerometers 26. The heading is initialized by the magnetic heading compass 28. The heading initialization is the most important initialization step. If the vehicle is moving the magnetic heading compass 28 will not be used to initialize the heading. The system is initialized based on where the operator of the vehicle indicates the vehicle is located and/or by GPS data. In other words, the operator can manually enter in the initial location and/or the system can use the GPS location.

Once the host vehicle begins moving the system 10 uses the various sensors to sense the movement of the vehicle. The attitude (pitch and roll) and heading of the host vehicle is sensed by the gyros 24. The speed of the vehicle is sensed by the Doppler radar 30. After sensing the attitude, heading, and speed, the system 10 calculates the velocity of the vehicle. The velocity of the vehicle is then integrated to determine the position of the vehicle. The system then uses a process to correct for errors in the system (see FIG. 6). The speed, heading and dead reckoning position errors are corrected by periodic GPS fixes. The attitude pitch and roll errors are corrected by sensing the acceleration caused by the motion of the vehicle. This is done via the accelerometers 26 and the knowledge of the vehicle speed and rotation rate. The accelerometers 26 sense the specific force accelerations acting on the vehicle including gravity, the acceleration of the vehicle, and centrifugal force. The gravity force is a known value and can be subtracted out. The remaining accelerations are then integrated to get a velocity. Similarly, the velocity and rotation rate of the vehicle are known and can be subtracted out. The remaining values can be used to correct the attitude errors.

Again, although the host vehicle of the preferred embodiment (rail car 70) may not use a guidance system, other types of host vehicles, such as a tractor, may. A vehicle using the navigation system 10 to help control a guidance system operates as follows and as described with FIG. 8 above. The primary information used by the guidance system from the navigation system 10 is the position of the host vehicle. As shown in FIG. 8, the guidance system receives a position signal from the navigation system 10 at a rate of 10 Hz. The guidance system also receives a vehicle heading signal from the navigation system 10 at a 10 Hz rate. Of course, the position and heading data could be received at any other suitable rate, but 10 Hz is the preferred rate. The desired path of the vehicle is provided to the guidance system from the processor memory, user input, or any other source. The guidance system computes cross track and heading error. Cross track error is the distance the vehicle is off from the desired path. Heading error is defined as the angular difference between the vehicle velocity and the desired path. The goal of the guidance system is to drive the cross track error to zero by guiding the vehicle along a desired path. The guidance algorithm 54 described above calculates the cross track error and the heading error to create guidance commands. These guidance commands are the steering signal used by the operator or by an automatic steering mechanism to steer the vehicle along the desired path.

A vehicle such as rail car 70 equipped with the navigation system 10 of the present invention is capable of very accurately keeping track of where the vehicle is and where it has already been. This information can be used for any number of purposes or applications. The navigation system provides accurate, real time data sufficient to allow a guidance system to navigate along a curved path.

The preferred embodiment of the navigation system 10 of the present invention may be configured as follows. A sensor package is contained within a single enclosure. The sensor package includes the rate gyros 24, the accelerometers 26 and the magnetic heading compass 28. The sensor package could act as a stand-alone inertial measurement unit with the capability of connecting to a vehicle and any other sensors desired. The Doppler radar position sensor 30 is attached to the vehicle and preferably pointed downward toward the railroad tracks or ground at an angle of about 30°. A display head includes the display unit 18, the processor 12, the GPS receiver 14, a tactile device (e.g., a keypad or keyboard), the DGPS radio receiver and the required power supplies. Two antennas (one GPS and one DGPS) are attached to the vehicle and connected to the appropriate receiver.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of determining the location of hazardous spots on a railroad track comprising the steps of:

providing an attitude sensor attachable to a rail car for measuring the attitude of the rail car;

moving the rail car over a length of railroad tracks;

sensing the attitude of the rail car at a plurality of positions on the railroad tracks as the rail car moves over the length of railroad tracks;

comparing the sensed attitude at the plurality of positions with reference attitudes at the plurality of positions; and determining the location of hazardous spots on the railroad track based on the comparison of the sensed attitudes with the reference attitudes.

2. A method of improving the safety of railroad systems comprising:

providing a rail vehicle placed on a set of railroad tracks;

determining the attitude of the rail vehicle at a plurality of positions on the railroad tracks;

sensing the position of the rail vehicle at the plurality of positions;

storing information based on the sensed attitude and sensed position for each of the plurality of positions; and forming a database using the stored information to indicate the current and past condition of the railroad tracks.

3. The method of claim 2 further comprising the steps of: predicting the future condition of the railroad tracks using the database.

4. The method of claim 2 further comprising the steps of:
determining the rate at which the condition of the railroad tracks deteriorates using information stored in the database; and determining when the railroad tracks need to be repaired or replaced based upon the rate of deterioration.

* * * * *